United States Patent
Shoji

(10) Patent No.: US 7,889,409 B2
(45) Date of Patent: Feb. 15, 2011

(54) OPTICAL SCANNING DEVICE AND IMAGE FORMING APPARATUS USING THE SAME

(75) Inventor: Katsunori Shoji, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 348 days.

(21) Appl. No.: 12/073,104

(22) Filed: Feb. 29, 2008

(65) Prior Publication Data

US 2008/0212155 A1   Sep. 4, 2008

(30) Foreign Application Priority Data

Mar. 1, 2007   (JP) ............... 2007-051317

(51) Int. Cl.
*G02B 26/08* (2006.01)
(52) U.S. Cl. .................................... 359/212.1
(58) Field of Classification Search ... 359/212.1–214.1, 359/205.1
See application file for complete search history.

(56) References Cited

U.S. PATENT DOCUMENTS

| | | | |
|---|---|---|---|
| 2003/0231364 A1 | 12/2003 | Shoji et al. | |
| 2006/0132880 A1* | 6/2006 | Amada et al. | 359/196 |
| 2007/0070173 A1 | 3/2007 | Yamakawa et al. | |
| 2007/0122192 A1 | 5/2007 | Yamakawa et al. | |
| 2007/0134023 A1 | 6/2007 | Shoji et al. | |
| 2007/0139745 A1 | 6/2007 | Shoji et al. | |
| 2007/0165099 A1 | 7/2007 | Yoshizawa et al. | |

FOREIGN PATENT DOCUMENTS

| | | |
|---|---|---|
| JP | 2003-182146 | 7/2003 |
| JP | 2005-049468 | 2/2005 |
| JP | 3913979 | 2/2007 |

OTHER PUBLICATIONS

Abstract of JP 2002-182145 published on Jun. 26, 2002.

* cited by examiner

*Primary Examiner*—Euncha P Cherry
(74) *Attorney, Agent, or Firm*—Harness, Dickey & Pierce, P.L.C.

(57) ABSTRACT

An optical scanning device including a light beam emission unit configured to emit a light beam, a main scanning line deflection unit configured to deflect the light beam in a main scanning direction to emit a scanning beam, a scanning lens configured to focus the scanning beam in the main scanning direction and a sub-scanning direction, a reflective optical element configured to deflect the scanning beam, a tilt adjustment unit configured to change a position of the reflective optical element to adjust a tilt of a scanning line of the scanning beam irradiating a target to be irradiated, and a curve adjustment unit configured to bend the reflective optical element to adjust a curve in the scanning line of the scanning beam irradiating the target to be irradiated.

8 Claims, 7 Drawing Sheets

OPTICAL SCANNING DEVICE AND IMAGE FORMING APPARATUS USING THE SAME

PRIORITY STATEMENT

The present patent application claims priority from Japanese Patent Application No. 2007-051317, filed on Mar. 1, 2007 in the Japan Patent Office, the entire contents of which are hereby incorporated herein by reference.

BACKGROUND

1. Technical Field

Example embodiments generally relate to an optical scanning device and an image forming apparatus using an electrophotographic method, such as a copier, a printer, a facsimile machine, and a multifunction apparatus that combines the functions of the copier, the printer, and the facsimile machine.

2. Description of the Related Art

A related-art image forming apparatus, such as a copier, a facsimile machine, a printer, or a multifunction printer having two or more of copying, printing, scanning, and facsimile functions, forms a toner image on a recording medium (e.g., a sheet) according to image data using an electrophotographic method. In such a method, for example, a charger charges a surface of an image bearing member (e.g., a photoconductor). An optical scanning device emits a light beam onto the charged surface of the photoconductor to form an electrostatic latent image on the photoconductor according to the image data. The electrostatic latent image is developed with a developer (e.g., a toner) to form a toner image on the photoconductor. A transfer device transfers the toner image formed on the photoconductor onto a sheet. A fixing device applies heat and pressure to the sheet bearing the toner image to fix the toner image onto the sheet. The sheet bearing the fixed toner image is then discharged from the image forming apparatus.

In such an image forming apparatus, the optical scanning device generally includes a light source, a polygon mirror serving as a deflector, an fθ lens, a long lens, and a reflection mirror serving as a reflective optical element. A light beam emitted from the light source is deflected and scanned at a constant angular speed by the polygon mirror being rotated, and enters the fθ lens. The fθ lens focuses the light beam in a main scanning direction and corrects the light beam such that the light beam may scan the photoconductor at a constant speed. Subsequently, the thus-corrected light beam enters the long lens, and is focused in a sub-scanning direction. At this time, an optical surface tangle error of the polygon mirror is also corrected. Thereafter, the light beam passing through the long lens is deflected by the reflection mirror, and irradiates the photoconductor.

In the above-described optical scanning device, a curve and a tilt may appear in a scanning line of the light beam irradiating the photoconductor due to curvature of field in the reflective optical element, deformation of a housing of the optical scanning device, thermal deformation of components provided in the optical scanning device caused by heat from a polygon motor, misalignment of the photoconductor, and so forth. When the curve and the tilt appear in the scanning line, a proper latent image corresponding to image data may not be formed on the photoconductor, and consequently, a proper image may not be obtained.

In a tandem type full-color image forming apparatus, toner images of different colors are respectively formed on a plurality of the photoconductors, and the toner images are superimposed on one another to form a full-color image. Accordingly, a user may more easily notice image irregularity in the full-color image caused by curves and tilts in the scanning lines of the light beams irradiating the respective photoconductors.

In other words, the user may rarely notice the image irregularity in a single-color image caused by a slight tilt and curve in the scanning line of the light beam. However, the curves and the tilts in the scanning lines of the light beams irradiating the respective photoconductors cause a color shift in the full-color image formed by the tandem type full-color image forming apparatus, and even a slight color shift may be easily noticed by the user as the image irregularity.

To solve such a problem, one example optical scanning device is proposed in which both a curve adjustment unit for bending a long lens to adjust a curve in a scanning line and a tilt adjustment unit for rotating a long lens to change a position of the long lens and adjust a tilt of the scanning line are provided.

Moreover, to meet demand for reduction in a number of components and downsizing of the optical scanning device, another example optical scanning device including a scanning lens having both characteristics of the fθ lens and the long lens has been widely used. In such an optical scanning device, a light beam emitted from a light source is deflected by a polygon mirror being rotated, and the thus deflected light beam enters the scanning lens. Subsequently, the scanning lens focuses the light beam in a main scanning direction and a sub-scanning direction such that the light beam irradiates the photoconductor to form a spot thereof having a predetermined or desired shape, and corrects the light beam to be scanned at a constant speed. At this time, an optical surface tangle error of the polygon mirror is also corrected. Thereafter, the light beam passing through the scanning lens is deflected by a reflection mirror and irradiates the photoconductor.

Because the optical scanning device including the scanning lens does not include the long lens, the curve and the tilt in the scanning line may not be adjusted by bending and rotating the long lens in contrast to the example optical scanning device including the long lens described above. Therefore, in the optical scanning device including the scanning lens, the tilt and the curve in the scanning line may be adjusted by bending and rotating the scanning lens having the characteristics of the long lens.

However, an angle of incidence of the light beam deflected by the polygon mirror on the scanning lens differs depending on a position of incidence of the light beam in the main scanning direction. Thus, the scanning lens focuses the light beam differently depending on each position of incidence of the light beam in the main scanning direction.

In other words, when the scanning lens is bent to adjust the curve in the scanning line and rotated to adjust the tilt of the scanning line, the position of incidence of the light beam is changed. As a result, the light beam entering the scanning lens may not be properly focused, and the irradiated light beam does not form a spot having a predetermined or desired shape on the photoconductor. Furthermore, dot latent images formed on each of the photoconductors are shifted toward the main scanning direction. Consequently, higher quality images may not be obtained.

SUMMARY

Example embodiments provide an optical scanning device in which a light beam is focused in a main scanning direction and a sub-scanning direction with a single scanning lens, and an image forming apparatus using the same. With the optical scanning device according to example embodiments, latent images formed on photoconductors may be reliably prevented from shifting toward the main scanning direction, and a tilt and a curve in a main scanning line of the light beam may be accurately corrected.

At least one embodiment provides an optical scanning device including a light beam emission unit configured to emit a light beam, a main scanning line deflection unit configured to deflect the light beam in a main scanning direction to emit a scanning beam, a scanning lens configured to focus the scanning beam in the main scanning direction and a sub-scanning direction, a reflective optical element configured to deflect the scanning beam, a tilt adjustment unit configured to change a position of the reflective optical element to adjust a tilt of a scanning line of the scanning beam irradiating a target to be irradiated, and a curve adjustment unit configured to bend the reflective optical element to adjust a curve in the scanning line of the scanning beam irradiating the target to be irradiated.

At least one embodiment provides an image forming apparatus including an image bearing member configured to bear an electrostatic latent image, a charging device configured to charge a surface of the image bearing member, an irradiating device configured to scan and irradiate a charged surface of the image bearing member with a light beam according to image data to form an electrostatic latent image thereon, a developing device configured to develop the electrostatic latent image with a toner to form a toner image, and a transfer device configured to transfer the toner image onto a recording medium. The irradiating device is an optical scanning device like that described above.

Additional features and advantages of the example embodiments will be more fully apparent from the following detailed description, the accompanying drawings, and the associated claims.

BRIEF DESCRIPTION OF THE DRAWINGS

A more complete appreciation of example embodiments and the many attendant advantages thereof will be readily obtained as the same becomes better understood by reference to the following detailed description when considered in connection with the accompanying drawings, wherein.

Figure 1:
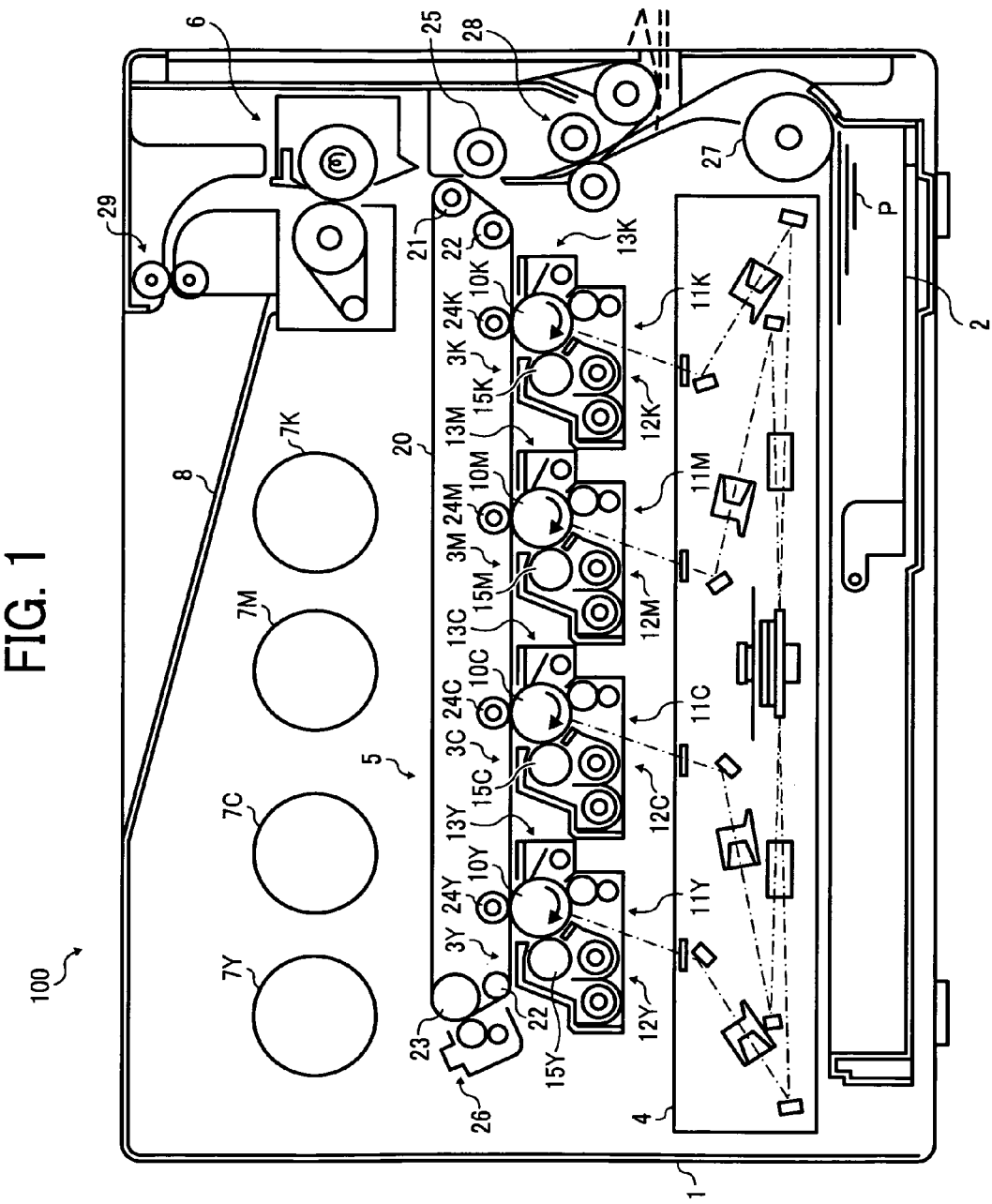
FIG. 1 is a schematic view illustrating a printer according to example embodiments.

The accompanying drawings are intended to depict example embodiments and should not be interpreted to limit the scope thereof. The accompanying drawings are not to be considered as drawn to scale unless explicitly noted.

DETAILED DESCRIPTION OF EXAMPLE EMBODIMENTS

It will be understood that if an element or layer is referred to as being "on", "against", "connected to", or "coupled to" another element or layer, then it can be directly on, against, connected or coupled to the other element or layer, or intervening elements or layers may be present. In contrast, if an element is referred to as being "directly on", "directly connected to", or "directly coupled to" another element or layer, then there are no intervening elements or layers present. Like numbers refer to like elements throughout. As used herein, the term "and/or" includes any and all combinations of one or more of the associated listed items.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of example embodiments.

The terminology used herein is for the purpose of describing example embodiments only and is not intended to be limiting. As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this specification is not intended to be limited to the specific terminology so selected and it is to be understood that each specific element includes all technical equivalents that operate in a similar manner and achieve a similar result. Reference is now made to the drawings, wherein like reference numerals designate identical or corresponding parts throughout the several views.

One example embodiment applied to a printer serving as an image forming apparatus (hereinafter "printer 100") is described in detail below. The example embodiment may be employed in, but is not limited to, a tandem type full-color image forming apparatus using an intermediate transfer system.

FIG. 1 is a schematic view illustrating the printer 100 according to example embodiments. The printer 100 includes a main body 1 and a paper feed cassette 2 which may be pulled out from the main body 1. The main body 1 includes image forming units 3Y, 3C, 3M, and 3K (hereinafter collectively "image forming units 3") in a central portion thereof to respectively form toner images of yellow (Y), cyan (C), magenta (M), and black (K). Additional characters Y, C, M, and K of reference numerals respectively indicate components to form toner images of yellow, cyan, magenta, and black.

Figure 2:
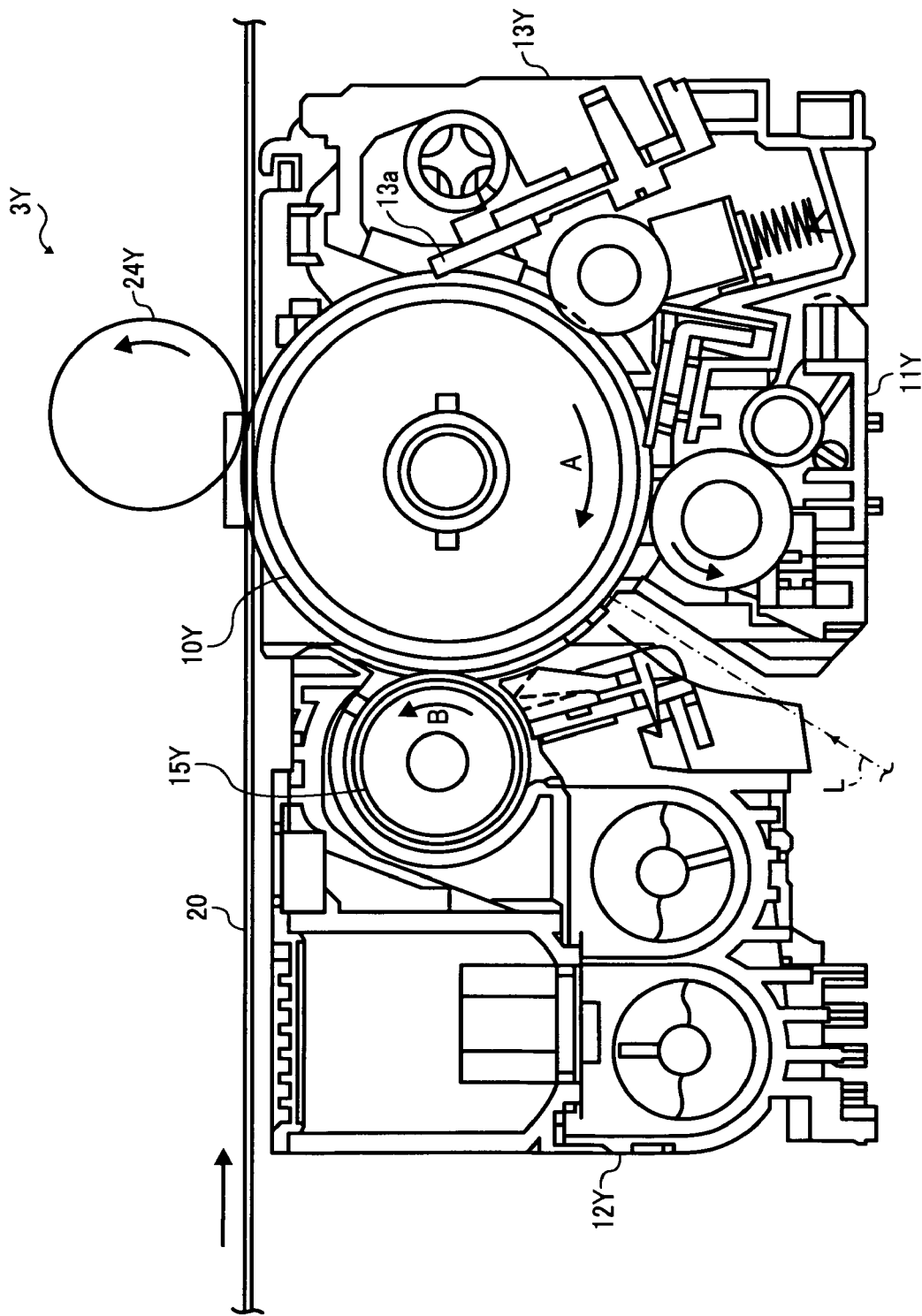
FIG. 2 is an enlarged schematic view illustrating an image forming unit in the printer illustrated in FIG. 1.

FIG. 2 is an enlarged schematic view illustrating the image forming unit 3Y. It is to be noted that the remaining image forming units 3C, 3M, and 3K also have the same configuration as the image forming unit 3Y illustrated in FIG. 2.

Referring to FIGS. 1 and 2, the image forming units 3Y, 3C, 3M, and 3K respectively include photoconductors 10Y, 10C, 10M, and 10K (hereinafter collectively "photoconductors 10"). The photoconductor 10 is drum-shaped, and is rotated in a direction indicated by an arrow A. The photoconductor 10 includes a cylindrical aluminum substrate with a diameter of 40 mm and a photoconductive layer such as an organic photoconductive layer which covers a surface of the cylindrical aluminum substrate. Each of the image forming units 3Y, 3C, 3M, and 3K further includes each of chargers 11Y, 11C, 11M, and 11K (hereinafter collectively "chargers 11") to charge the photoconductor 10, each of developing devices 12Y, 12C, 12M, and 12K (hereinafter collectively "developing devices 12") to develop a latent image formed on the photoconductor 10, and each of cleaning devices 13Y, 13C, 13M, and 13K (hereinafter collectively "cleaning devices 13") to clean residual toner particles on the photoconductor 10. The charger 11, the developing device 12, and the cleaning device 13, respectively, are arranged around the photoconductor 10. The main body 1 further includes an optical scanning device 4 capable of directing a light beam L onto the photoconductor 10 below the image forming unit 3 so as to irradiate the photoconductor 10. An intermediate transfer unit 5, including an intermediate transfer belt 20 onto which the toner image formed in the image forming unit 3 is transferred, is provided above the image forming unit 3. The main body 1 further includes a fixing device 6 to fix the toner image transferred onto the intermediate transfer belt 20 to a transfer sheet P. Toner bottles 7Y, 7C, 7M, and 7K (hereinafter collectively "toner bottles 7"), each of which stores a toner of each color of yellow, cyan, magenta, and black, are provided in an upper portion of the main body 1. The toner bottle 7 is detachably attached to the main body 1 by opening a discharge tray 8 provided on top of the main body 1.

The optical scanning device 4 deflects the light beam L emitted from a laser diode serving as a light source using a polygon mirror or the like, and irradiates the photoconductor 1 with the light beam L while scanning the light beam L over the surface of the photoconductor 1. The optical scanning device 4 will be described in detail later.

The intermediate transfer belt 20 included in the intermediate transfer unit 5 is stretched over a driving roller 21, a tension roller 22, and a driven roller 23, and is rotatively driven in a counterclockwise direction in FIG. 1 at a predetermined or desired timing.

The intermediate transfer unit 5 further includes a primary transfer rollers 24Y, 24C, 24M, and 24K (hereinafter collectively "primary transfer rollers 24") to transfer the toner images formed on each of the photoconductor 10 onto the intermediate transfer belt 20. The intermediate transfer unit 5 further includes a secondary transfer roller 25 to transfer the toner images transferred onto the intermediate transfer belt 20 onto the transfer sheet P, and a belt cleaning device 26 to clean residual toner particles remaining on the intermediate transfer belt 20 which are not transferred onto the transfer sheet P.

A description is now given of color image formation performed in the printer 100.

In the image forming unit 3, each charger 11 evenly charges the surface of each photoconductor 10. Subsequently, the optical scanning device 4 directs the light beam L onto each photoconductor 1 according to image data to form latent images on each photoconductor 10. The thus-formed latent images are developed with a toner of each color carried by each of developing rollers 15Y, 15C, 15M, and 15K (hereinafter collectively "developing rollers 15") in each of the developing device 12 so that toner images are formed. The toner images of each color formed on each of the photoconductor 10 are sequentially transferred onto the intermediate transfer belt 20 by the primary transfer roller 24 at a respective timing from an upstream side to a downstream side relative to a rotation direction of the intermediate transfer belt 20 so that the toner images are superimposed on one another at the same position on the intermediate transfer belt 20. A cleaning blade 13a provided in each of the cleaning devices 13 cleans the surface of each of the photoconductors 10 after primary transfer has been performed to make the printer 100 ready for next image formation. A predetermined or desired amount of the toner stored in the toner bottle 7 is supplied to the developing device 12 as needed through a conveyance path, not shown.

Meanwhile, the transfer sheet P stored in the paper feed cassette 2 is fed to the main body 1 by a paper feed roller 27 provided in the vicinity of the paper feed cassette 2, and is conveyed to the secondary transfer roller 25 by a pair of registration rollers 28 at a predetermined or desired timing. Accordingly, the toner image on the intermediate transfer belt 20 is transferred onto the transfer sheet P by the secondary transfer roller 25. The transfer sheet P having the transferred toner image thereon passes through the fixing device 6 so that the toner image is fixed to the transfer sheet P. Thereafter, the transfer sheet P having the toner image thereon is discharged to the discharging tray 8 by a discharging roller 29. The belt cleaning device 26 provided in contact with the intermediate transfer belt 20 removes residual toner particles remaining on the intermediate transfer belt 20 in a similar way in which the cleaning device 13 cleans the surface of the photoconductor 10.

A description is now given of a configuration of the optical scanning device 4.

Figure 3:
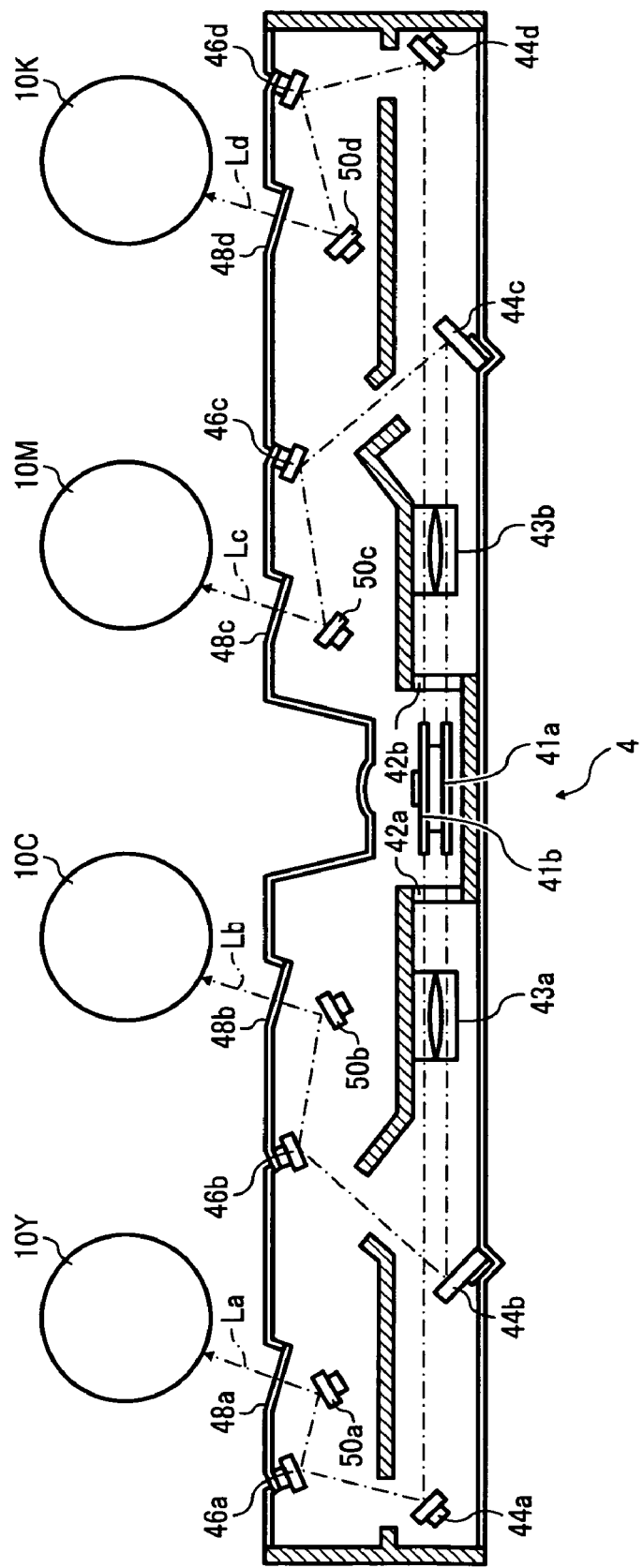
FIG. 3 is a schematic view illustrating a configuration of an optical scanning device according to example embodiments.

FIG. 3 is a schematic view illustrating the configuration of the optical scanning device 4 according to example embodiments. Referring to FIG. 3, the optical scanning device 4 includes two polygon mirrors 41a and 41b, each having a regular polygon prism shape. Each of the polygon mirrors 41a and 41b has reflection mirrors on lateral side surfaces thereof, and is rotated around a central axis thereof at a higher speed by a polygon motor, not shown. The light beam L emitted from a laser diode, not shown, enters the lateral side surfaces of each of the polygon mirrors 41a and 41b, and is deflected and scanned by each of the polygon mirrors 41a and 41b. The optical scanning device 4 further includes soundproof glasses 42a and 42b to reduce noise from the polygon motor; scanning lenses 43a and 43b to focus the light beam L scanned by each of the polygon mirrors 41a and 41b in a main scanning direction and a sub-scanning direction to convert equiangular motion of the light beam L into uniform linear motion and to correct an optical surface tangle error of the polygon mirrors 41a and 41b; mirrors 44a, 44b, 44c, 44d, 46a, 46b, 46c, and 46d to guide the light beam L to respective photoconductors 10; mirror units 50a, 50b, 50c, and 50d (hereinafter collectively "mirror units 50") to adjust a tilt and a curve in a scanning line of the light beam L; and dustproof glasses 48a, 48b, 48c, and 48d to prevent a dust from falling into a housing of the optical scanning device 4. In FIG. 3, each of reference symbols La, Lb, Lc, and Ld indicates an optical path of the light beam L irradiating each of the photoconductors 10Y, 10C, 10M, and 10K.

A description is now given of a scanning line adjustment unit to adjust a tilt and a curve in the scanning line provided in the optical scanning device 4.

The scanning line adjustment unit according to example embodiments may adjust not only a tilt of the scanning line but also a curve in the scanning line. The curve in the scanning line is adjusted by forcibly deforming mirrors provided in each of the mirror unit 50, and the tilt of the scanning line is adjusted by changing a position of each of the mirrors. In example embodiments, a mechanism for adjusting the curve in the scanning line is provided in each of the mirror unit 50. However, although a mechanism for adjusting the tilt of the scanning line is provided in each of the mirror units 50a, 50b, and 50c corresponding to each of the photoconductors 10Y, 10C, and 10M, the mechanism is not provided in the mirror unit 50d corresponding to the photoconductor 10K.

The configuration of the mirror unit 50 is described in detail below with reference to the mirror unit 50a corresponding to the photoconductor 10Y. In the description below, additional characters Y, C, M, and K, and a, b, c, and d of reference numerals which respectively indicate a toner color of yellow, cyan, magenta, and black are omitted.

Figure 4:
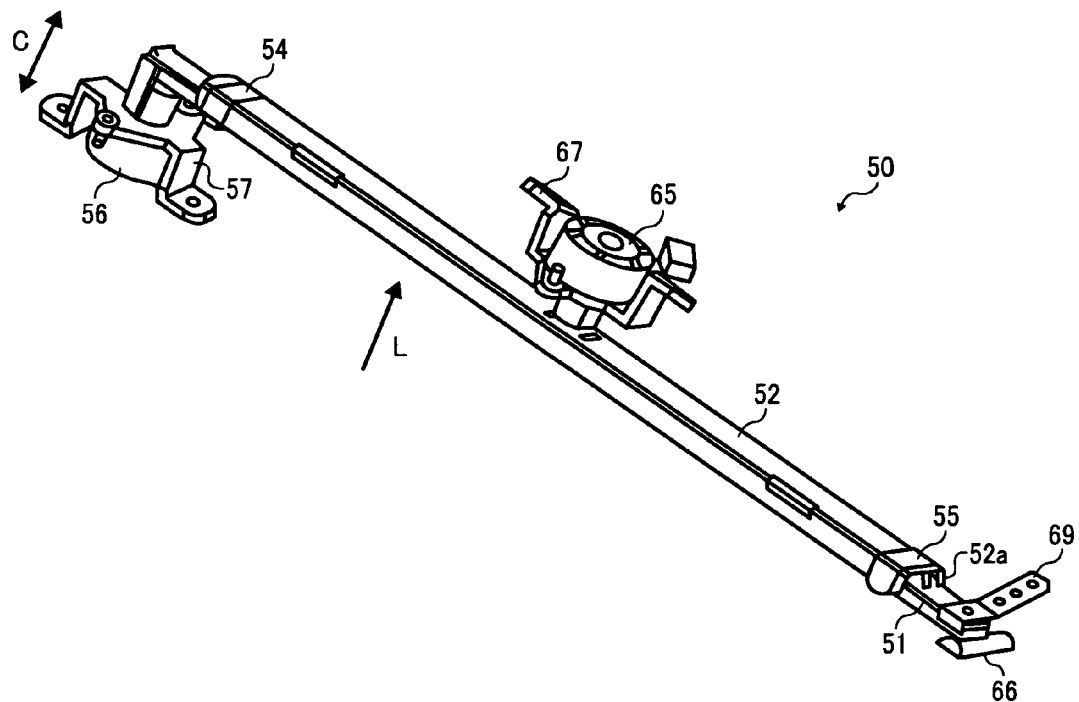
FIG. 4 is a perspective view illustrating a mirror unit provided in the optical scanning device illustrated in FIG. 3.
Figure 5:
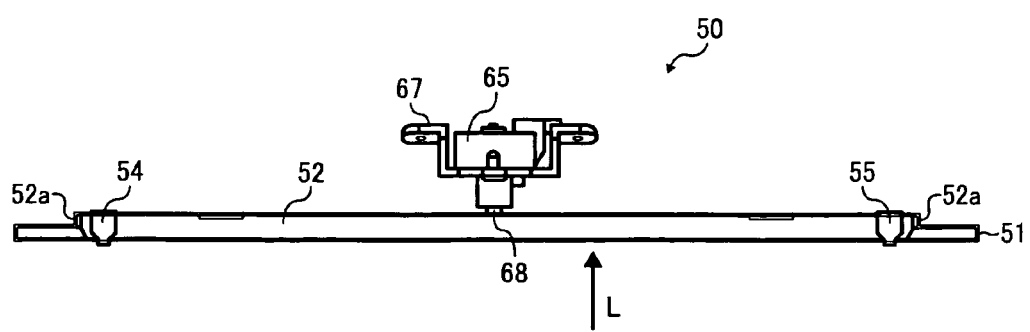
FIG. 5 is a schematic view illustrating the mirror unit illustrated in FIG. 4 viewed from a direction perpendicular to an optical path of a light beam.
Figure 6:
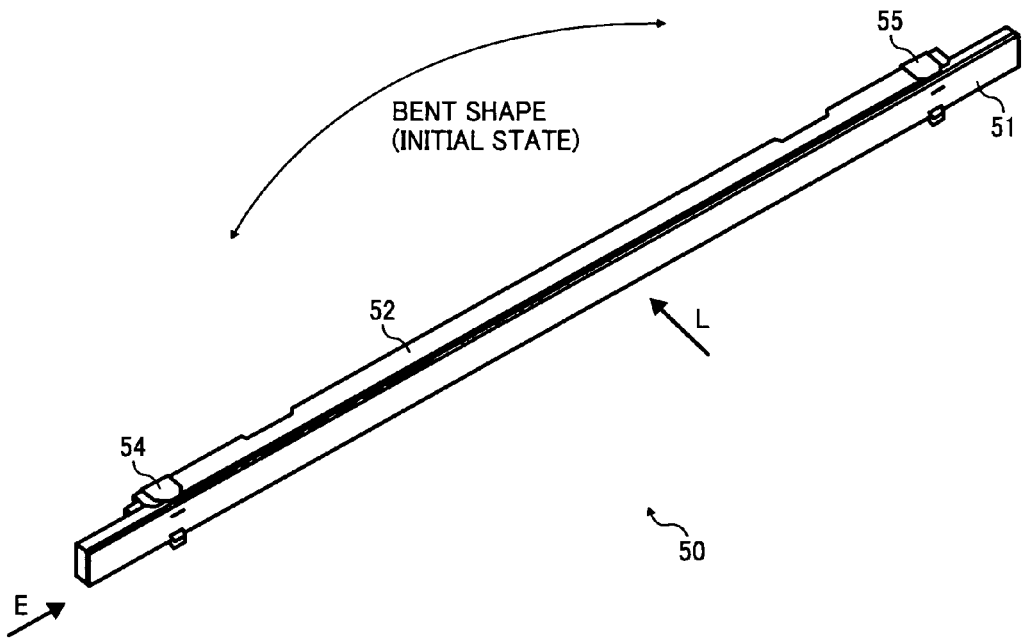
FIG. 6 is a perspective view illustrating main components of the mirror unit.
Figure 7:
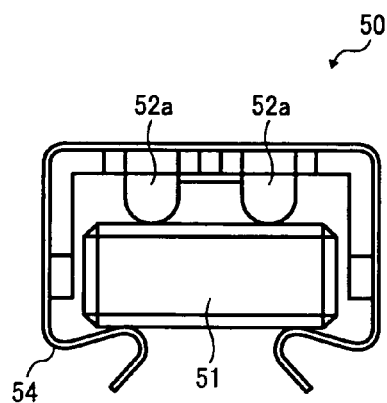
FIG. 7 is a side view illustrating the main components of the mirror unit viewed from a direction indicated by an arrow E in FIG. 6.

FIG. 4 is a perspective view illustrating the mirror unit 50. FIG. 5 is a schematic view illustrating the mirror unit 50 viewed from a direction perpendicular to the optical path of the laser beam L. FIG. 6 is a perspective view illustrating main components of the mirror unit 50. FIG. 7 is a side view illustrating the main components of the mirror unit 50 viewed from a direction indicated by an arrow E in FIG. 6.

Referring to FIGS. 4 through 7, the mirror unit 50 includes a mirror 51 serving as a reflective optical element to guide the light beam L to the photoconductor 10, a bracket 52 to hold the mirror 51, fixing flat springs 54 and 55, and so forth. The mirror unit 50 further includes a pressing unit to adjust the curve in the scanning line. The pressing unit includes a curve adjustment pulse motor 65, a curve adjustment pulse motor holder 67, and a curve adjuster 68 including a cap nut. The mirror unit 50 further includes a tilt adjustment unit. The tilt adjustment unit includes a tilt adjustment pulse motor 56, a tilt adjustment pulse motor holder 57, and a tilt adjuster 58 including a cap nut.

Figure 8:
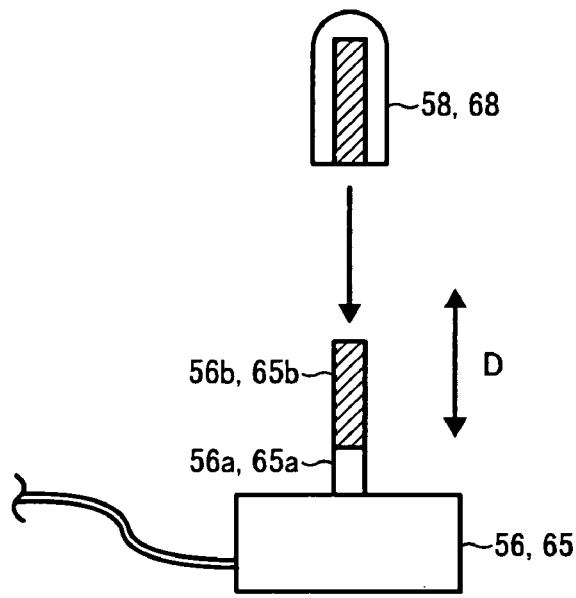
FIG. 8 is a schematic view illustrating main components of a tilt adjustment unit.
Figure 9:
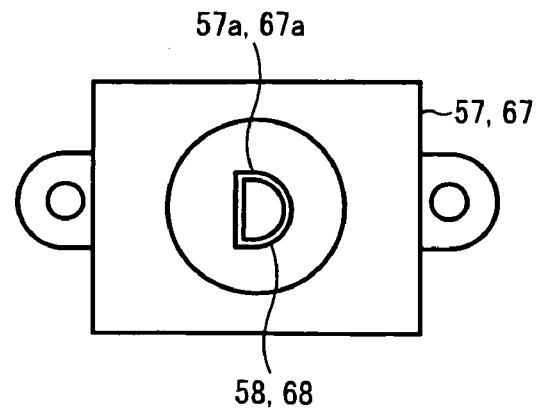
FIG. 9 is a top view illustrating the tilt adjustment unit.

FIG. 8 is a schematic view illustrating main components of the tilt adjustment unit. FIG. 9 is a top view illustrating the tilt adjustment unit. A screw 56b is provided on an output shaft 56a of the tilt adjustment pulse motor 56. The tilt adjuster 58 is engaged with, but is not tightened on, the screw 56b. The tilt adjuster 58 has a cross-section shaped like the letter "D" as illustrated in FIG. 9, and is inserted into a D-shaped adjuster insertion opening 57a provided on the tilt adjustment pulse motor holder 57 so that rotation of the tilt adjuster 58 is restricted by the tilt adjustment pulse motor holder 57. Accordingly, the tilt adjuster 58 may not be rotated along with a rotation of the output shaft 56a of the tilt adjustment pulse motor 56, so that the tilt adjuster 58 is moved vertically in directions indicated by a two-headed arrow D in FIG. 8 along with the rotation of the output shaft 56a. The pressing unit to adjust the curve in the scanning line also includes the same configuration as that of the tilt adjustment unit. For example, in the same manner as the configuration illustrated in FIG. 8, a screw 65b is provided on an output shaft 65a of the curve adjustment pulse motor 65. The curve adjuster 68 is engaged with, but is not tightened on, the screw 65b. Similarly to the configuration illustrated in FIG. 9, the curve adjuster 68 has a cross-section shaped like the letter "D", and is inserted into a D-shaped adjuster insertion opening 67a provided on the curve adjustment pulse motor holder 67, so that rotation of the curve adjuster 68 is restricted by the curve adjustment pulse motor holder 67.

When the mirror 51 is mounted on the bracket 52, first, the mirror 51 abuts mirror supports 52a having a protrusion provided on both edges of the bracket 52 in a longitudinal direction to appropriately set the mirror 51 on the bracket 52 as illustrated in FIG. 5. Thereafter, referring back to FIG. 7, the mirror 51 and the bracket 52 are covered by the fixing flat springs 54 and 55 each having a U-like shape so that the mirror 51 is fixed to the bracket 52 at both edges of the bracket 52 in a longitudinal direction thereof. Each of the fixing flat springs 54 and 55 is provided closer to the center of the mirror unit 50 as compared to each of the mirror supports 52a, and presses the mirror 51 from a surface of the mirror 51 opposite to a surface abutting the mirror supports 52a, serving as a reflective surface. Consequently, the mirror 51 is held on the bracket 52 in a bent shape by an energized force from the mirror supports 52a and the fixing flat springs 54 and 55 as illustrated in FIG. 6. A curve adjustment hole, not shown, is provided at the center of the bracket 52. The curve adjuster 68 is inserted into the curve adjustment hole, and a top of the curve adjuster 68 abuts the center of the surface of the mirror 51 provided opposite to the reflective surface thereof. The curve adjustment pulse motor holder 67 is fixed to the bracket 52 by a fixing member, not shown.

An edge of the mirror unit 50 opposite to the edge in which the tilt adjustment pulse motor 56 is provided (hereinafter "tilt adjustment edge") is hereinafter referred to as a free edge. The free edge is placed on a support stand 66 mounted on the housing of the optical scanning device 4. The tilt adjustment pulse motor holder 57 holding the tilt adjustment pulse motor 56 is also mounted on the housing. The top of the tilt adjuster 58 engaged with the screw 56b provided on the output shaft 56a of the tilt adjustment pulse motor 56 abuts the tilt adjustment edge on the reflective surface of the mirror 51. A flat spring 69 fixed to the housing of the optical scanning device 4 abuts the free edge on the surface opposite to the reflective surface of the mirror 51 so that the mirror 51 is sandwiched between the supporting stand 66 and the flat spring 69, and the free edge of the mirror unit 50 is held in a direction of the optical path of the laser beam L.

A description is now given of a method of adjusting a tilt of the scanning line according to example embodiments.

Figure 10:
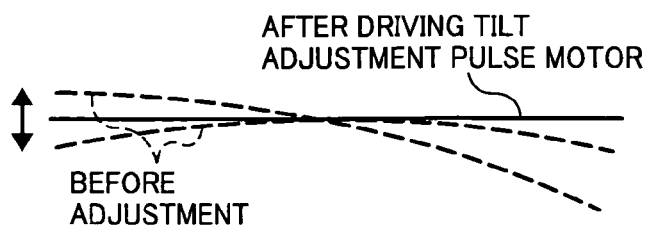
FIG. 10 is a view illustrating adjustment of a tilt of a scanning line.

The tilt of the scanning line is adjusted before shipment of the printer 100 and during operation of the printer 100 at a predetermined or desired timing, such as when a predetermined or desired number of sheets are printed, or a user instruction is received. To adjust the tilt of the scanning line, first, a predetermined or desired latent image for tilt adjustment of each color is formed on each of the photoconductors 10Y, 10C, 10M, and 10K in a similar way as normal image formation. Subsequently, the latent image for tilt adjustment of each color is developed with a toner of each color to form a toner image for tilt adjustment of each color in a similar way as normal image formation. The toner images thus formed are transferred onto the intermediate transfer belt 20, and are detected by an optical sensor, not shown, to obtain positional differences between the black toner image for tilt adjustment and each of the toner images for tilt adjustment of other colors, namely, yellow, cyan, and magenta toner images for tilt adjustment. Thereafter, tilt amounts of the scanning line of each of the yellow, cyan, and magenta toner images relative to the scanning line of the black toner image are calculated to minimize each of the positional differences described above, and the tilt amounts thus calculated are respectively output to a tilt control unit, not shown. The tilt control unit controls a rotation angle of the tilt adjustment pulse motor 56 based on the calculated tilt amounts. As a result, the tilt adjuster 58 engaged with the output shaft 56a of the tilt adjustment pulse motor 56 is moved vertically, and the tilt adjustment edge of the mirror unit 50 is moved in directions indicated by a two-headed arrow C in FIG. 4. In other words, the tilt adjustment edge of the mirror unit 50 is raised as the tilt adjuster 58 is raised. Therefore, the mirror unit 50 is rotated in a clockwise direction in FIG. 4 around the supporting stand 66 to change the position thereof. On the other hand, the tilt adjustment edge of the mirror unit 50 is lowered as the tilt adjuster 58 is lowered. Therefore, the mirror unit 50 is rotated in a counterclockwise direction in FIG. 4 around the supporting stand 66 to change the position thereof. When the position of the mirror unit 50 is changed as described above, the position of incidence of the light beam L on the reflective surface of the mirror 51 is changed, and consequently, the tilt of the scanning line of the light beam L irradiating the photoconductor 10 is changed. As a result, the tilt of the scanning line generated before adjustment indicated with a dotted line in FIG. 10 may be corrected as indicated by a solid line in FIG. 10.

According to example embodiments, the tilt of the scanning line is adjusted by rotating the mirror unit 50 around the free edge of the mirror unit 50. In such a case, the tilt adjustment edge of the mirror unit 50 is moved twice as far to adjust the tilt of the scanning line as compared to a case in which the mirror unit 50 is rotated around the center thereof. Therefore, an adjustment angle of the tilt adjustment pulse motor 56 per pulse may be more precisely set as compared to the case in which the mirror unit 50 is rotated around the center thereof, so that the scanning line may be more accurately adjusted. If the mirror unit 50 is rotated around the center thereof, a member serving as a fulcrum is required to be provided on the surface opposite to the reflective surface of the mirror 51. On the other hand, when the mirror unit 50 is rotated around the free edge thereof, the fulcrum may be provided on the reflective surface of the mirror 51 except in an area where the light beam L enters, providing variety of configuration.

When the tilt of the scanning line is adjusted by using the long lens as described above, the long lens is rotated in a direction where the longitudinal direction of the long lens is perpendicular to the optical path of the light beam L to correct the tilt of the scanning line. Therefore, in a case in which the long lens is rotated around the free edge thereof to correct the tilt of the scanning line, the long lens needs to have a longer length in the direction where the longitudinal direction thereof is perpendicular to the optical path of the laser beam L as compared to a case in which the long lens is rotated around the center thereof. Similarly to the case described above, when the long lens is rotated around the free edge thereof, the tilt adjustment edge of the long lens is moved twice as far to adjust the tilt of the scanning line as compared to the case in which the long lens is rotated around the center thereof. Consequently, if the long lens has a shorter length in the direction where the longitudinal direction thereof is perpendicular to the optical path of the light beam L, the light beam L may not entirely enter the long lens. Therefore, when the long lens is rotated around the free edge thereof to correct the tilt of the scanning line, the long lens is required to have the longer length, limiting configuration. However, in example embodiments, the mirror unit 50 is rotated around the free edge thereof in a direction parallel to the optical path of the light beam L to correct the tilt of the scanning line. Therefore, the mirror unit 50 is not required to have a longer length in spite of the fact that the tilt adjustment edge of the mirror unit 50 is moved twice as far to adjust the tilt of the scanning line as compared to the case in which the mirror unit 50 is rotated around the center thereof. As a result, a variety of configurations may be provided even when the mirror unit 50 is rotated around the free edge thereof.

A description is now given of a method of adjusting a curve in the scanning line according to example embodiments.

A curve in the scanning line is adjusted before shipment of the printer 100 and during operation of the printer 100 at a predetermined or desired timing, such as when a predetermined or desired number of sheets are printed, or a user instruction is received.

A curve in the scanning line is adjusted before shipment as follows.

Figure 11:
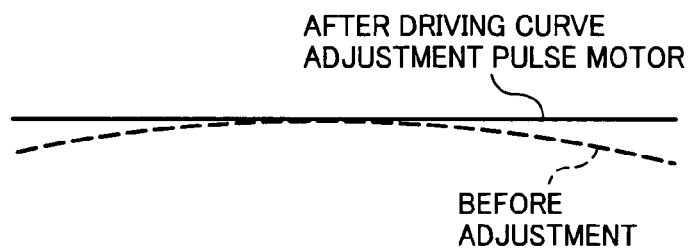
FIG. 11 is a view illustrating adjustment of a curve in a scanning line.

In an initial state, the center of the mirror 51 in the longitudinal direction thereof is bent toward the bracket 52 as illustrated in FIG. 6 due to an energized force from the fixing flat springs 54 and 55. At this time, the scanning line is bent as illustrated with a dotted line in FIG. 11. When the curve adjustment pulse motor 65 is rotated to move the curve adjuster 68 in a direction apart from the curve adjustment pulse motor 65, the top of the curve adjuster 68 abuts the center in the longitudinal direction of the mirror 51. The curve adjustment pulse motor 65 is further rotated to move the curve adjuster 68 in the direction further apart from the curve adjustment pulse motor 65, and the curve adjuster 68 presses the center in the longitudinal direction of the mirror 51 so that a distance between the center in the longitudinal direction of the mirror 51 and the bracket 52 increases. The mirror 51 is fixed to the bracket 52 by the fixing flat springs 54 and 55 at the both edges in the longitudinal direction of the bracket 52, and has less rigidity than that of the bracket 52. Therefore, the mirror 51 is straightened in the longitudinal direction thereof by moving the curve adjuster 68. A curved amount of the scanning line of the light beam L reflected on the mirror 51 is changed in accordance with a bent amount of the mirror 51. In other words, the curve in the scanning line may be corrected by adjusting a moving amount of the curve adjuster 68.

A curve in the scanning line is adjusted during operation of the printer 100 as follows.

First, latent images for curve adjustment of each color are formed on each of the photoconductors 10Y, 10C, 10M, and 10K in a similar way as normal image formation. Subsequently, the latent images for curve adjustment of each color are developed with a toner of each color to form toner images for curve adjustment of each color as in normal image formation. The thus-formed toner images are transferred onto the intermediate transfer belt 20, and are detected by an optical sensor, not shown, to obtain curve amounts in the scanning line in the toner images for curve adjustment of each color. Thereafter, curve amounts for the toner images of each color are calculated to minimize each of the curve amounts obtained by the optical sensor, and the curve amounts thus calculated are respectively output to a curve control unit, not shown. The curve control unit controls a rotation angle of the curve adjustment pulse motor 65 based on the calculated curve amounts. As a result, the curve adjuster 68 engaged with the output shaft 65a of the curve adjustment pulse motor 65 is moved vertically, and the curve in the scanning line is corrected.

An example variation of the mirror unit 50 is described in detail below.

Figure 12:
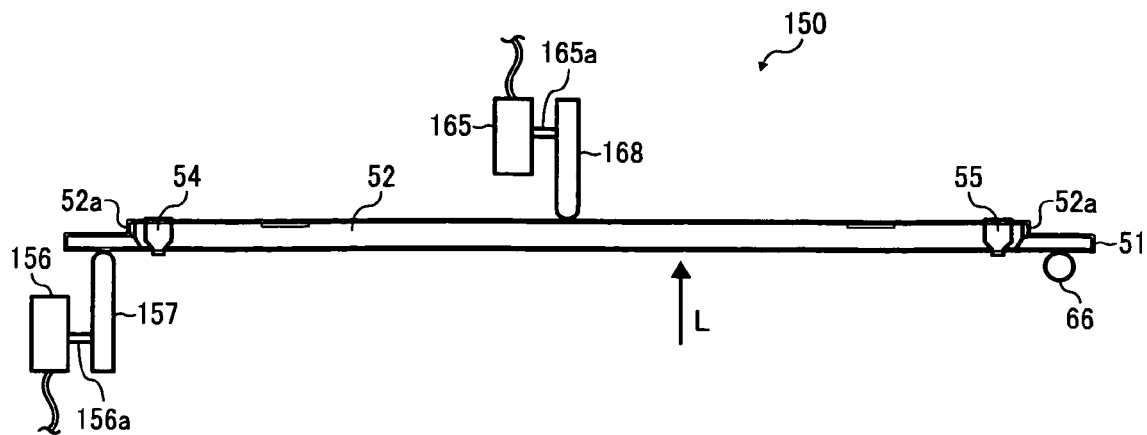
FIG. 12 is a schematic view illustrating an example variation of the mirror unit.

FIG. 12 is a schematic view illustrating an embodiment of another mirror unit 150, which is an example variation of the mirror unit 50. Referring to FIG. 12, the mirror unit 150 includes a pressing unit to adjust the curve in the scanning line including a curve adjustment pulse motor 165 and a curve adjustment cam 168. The curve adjustment cam 168 is provided on an output shaft 165a of the curve adjustment pulse motor 165. A part of the curve adjustment cam 168 passes through a curve adjustment hole, not shown, provided at the center in the longitudinal direction of the bracket 52, and abuts the center in the longitudinal direction of the mirror 51. A rotation angle of the curve adjustment pulse motor 165 is controlled so that an amount by which the curve adjustment cam 168 protrudes from the bracket 52 may be controlled. Therefore, a pressing force of the curve adjustment cam 168 against the center in the longitudinal direction of the mirror 51 is controlled, and the curve in the scanning line may be corrected.

In the example variation of the mirror unit 50, the tilt adjustment unit to adjust the tilt of the scanning line includes a tilt adjustment pulse motor 156 and a tilt adjustment cam 157. The tilt adjustment cam 157 is provided on an output shaft 156a of the tilt adjustment pulse motor 156. The tilt adjustment cam 157 abuts the tilt adjustment edge of the mirror 51. A rotation angle of the tilt adjustment pulse motor 156 is controlled so that the tilt adjustment edge of the mirror unit 50 is rotated around the free edge thereof. As a result, the tilt of the scanning line may be corrected.

In example embodiments, the tilt and the curve in the scanning line are adjusted by using the mirror unit 50 which is provided furthest from the scanning lens 43 among the mirrors provided in the optical scanning device 4. Alternatively, the tilt and the curve may be adjusted by using the mirrors 44a to 44d, or the mirrors 46a to 46d. However, use of the mirror unit 50 provided furthest from the scanning lens 43 is preferable for adjusting the tilt and the curve in the scanning line to correct the scanning line of the light beam L sufficiently focused in the main scanning direction and the sub-scanning direction.

In the optical scanning device according to example embodiments, the light beam L is focused in the main scanning direction and the sub-scanning direction by the single scanning lens 43. Therefore, a number of components may be reduced as compared to the optical scanning device including both the fθ lens to focus the light beam L in the main scanning direction and the long lens to focus the light beam L in the sub-scanning direction. As a result, the optical scanning device according to example embodiments may be downsized, and a variety of configuration may be provided.

In addition, the tilt of the scanning line is adjusted by changing the position of the mirror 51 serving as the reflective optical element. Therefore, when the tilt of the scanning line is adjusted, shift of the scanning line toward the main scanning direction may be suppressed as compared to the optical scanning device in which the tilt of the scanning line is adjusted by changing the position of the optical lens 43 which focuses the light beam L in both the main scanning direction and the sub-scanning direction. Moreover, the mirror 51 is bent to adjust the curve in the scanning line. Therefore, when the curve in the scanning line is adjusted, a shift or displacement of the scanning line toward the main scanning direction may be suppressed as compared to the optical scanning device in which the curve in the scanning line is adjusted by bending the optical lens 43 which focuses the light beam L in both the main scanning direction and the sub-scanning direction.

In the optical scanning device according to example embodiments, the curve in the scanning line is adjusted by using the fixing flat springs 54 and 55, each of which bends the mirror 51 in a direction perpendicular to the reflective surface of the mirror 51, and the pressing unit which abuts the center in the longitudinal direction of the mirror 51 to press the center of the mirror 51 in a direction opposite to the direction in which the mirror 51 is bent by the fixing flat springs 54 and 55. In other words, the curve in the scanning line of the light beam L irradiating the photoconductor 10 may be adjusted by controlling a force with which the pressing unit presses against the center in the longitudinal direction of the mirror 51. Therefore, when the scanning line is bent in a concave shape due to a temperature change or the like, the center in the longitudinal direction of the mirror 51 is further pressed by the pressing unit to straighten the bent scanning line. On the other hand, when the scanning line is bent in a convex shape due to a temperature change or the like, the pressing force of the pressing unit against the center in the longitudinal direction of the mirror 51 is reduced, so that the curve in the scanning line may be straightened. Thus, with the above-described configuration, the curve in the scanning line caused by a temperature change or the like may be reliably corrected, preventing color shift for an extended period of time.

In the optical scanning device according to example embodiments, the pressing unit includes the curve adjustment pulse motor 65 of the controllable rotation angle; the curve adjuster 68 engaged with the screw 65b provided on the output shaft 65a of the curve adjustment pulse motor 65 to abut the center in the longitudinal direction on the surface opposite to the reflective surface of the mirror 51; and the curve adjustment pulse motor holder 67 to restrict rotation of the curve adjuster 68. The curve adjustment pulse motor holder 67 restricts the rotation of the curve adjuster 68 as described above so that the curve adjuster 68 is not rotated along with a rotation of the output shaft 65a of the curve adjustment pulse motor 65. As a result, the curve adjuster 68 engaged with the output shaft 65a of the curve adjustment pulse motor 65 is lowered along with the rotation of the screw 65b, and presses the center in the longitudinal direction of the mirror 51. Thus, the curve in the mirror 51 is corrected, and consequently, the curve in the scanning line may be corrected. Because the rotation angle of the curve adjustment pulse motor 65 is controllable, the pressing force of the curve adjuster 68 against the center in the longitudinal direction of the mirror 51 may be accurately controlled.

Alternatively, the pressing unit may include the curve adjustment pulse motor 165 of controllable rotation angle, and the curve adjustment cam 168 which abuts the center of the surface opposite to the reflective surface of the mirror 51 and is rotated along with the rotation of the curve adjustment pulse motor 165. With such a configuration, the pressing force of the curve adjustment cam 168 against the center in the longitudinal direction of the mirror 51 may be accurately controlled by controlling the rotation angle of the curve adjustment pulse motor 165. As a result, the curve in the mirror 51 is corrected, and consequently, the curve in the scanning line may be corrected.

In the optical scanning device according to example embodiments, the tilt of the scanning line is adjusted by rotating the tilt adjustment edge of the mirror 51 around the free edge of the mirror 51 in a direction perpendicular to the reflective surface of the mirror 51. In a case in which the mirror 51 is rotated around the free edge thereof, the tilt adjustment edge of the mirror unit 50 is moved twice as far to adjust the tilt of the scanning line as compared to the case in which the mirror unit 50 is rotated around the center thereof. Therefore, an adjustment angle of the tilt adjustment pulse motor 56 per pulse may be more precisely set as compared to the case in which the mirror unit 50 is rotated around the center thereof, so that the tilt of the scanning line may be more accurately adjusted.

Moreover, when the mirror unit 50 is rotated around the center thereof, a member serving as a fulcrum needs to be provided on the surface opposite to the reflective surface of the mirror 51. However, when the mirror unit 50 is rotated around the free edge thereof, the fulcrum may be provided on the reflective surface of the mirror 51 except in the area where the light beam L enters. Therefore, a variety of configurations may be allowed as compared to the case in which the mirror unit 50 is rotated around the center thereof, in which configuration variety is necessarily limited by the need to provide the fulcrum on the surface opposite to the reflective surface of the mirror 51.

In the optical scanning device according to example embodiments, the tilt adjustment unit includes the tilt adjustment pulse motor 56 of controllable rotation angle, the tilt adjuster 58 engaged with the screw 56b provided on the output shaft 56a of the tilt adjustment pulse motor 56 to abut the tilt adjustment edge on the reflective surface of the mirror 51, and the tilt adjustment pulse motor holder 57 to restrict rotation of the tilt adjuster 58. The tilt adjustment pulse motor holder 57 restricts the rotation of the tilt adjuster 58 as described above so that the tilt adjuster 58 is not rotated along with a rotation of the output shaft 56a of the tilt adjustment pulse motor 56. As a result, the tilt adjuster 58 engaged with the output shaft 56a of the tilt adjustment pulse motor 56 is raised along with the rotation of the screw 56b, and presses the tilt adjustment edge of the mirror 51. Therefore, the mirror unit 50 is rotated around the free edge thereof in a direction perpendicular to the reflective surface of the mirror 51 to correct the tilt of the scanning line. Moreover, the rotation angle of the tilt adjustment pulse motor 56 may be controlled so that the rotation amount of the mirror unit 50 may be accurately controlled.

Alternatively, the tilt adjustment unit may include the tilt adjustment pulse motor 156 of controllable rotation angle, and the tilt adjustment cam 157 which abuts the mirror 51 and is rotated by the rotation of the tilt adjustment pulse motor 156. With such a configuration, the tilt adjustment cam 157 may control the rotation amount of the mirror unit 50 by controlling the rotation angle of the tilt adjustment pulse motor 156, and consequently, the tilt of the scanning line may be accurately corrected.

Example embodiments are not limited to the details described above, and various modifications and improvements are possible without departing from the spirit and scope of example embodiments. It is therefore to be understood that, within the scope of the associated claims, example embodiments may be practiced otherwise than as specifically described herein. For example, elements and/or features of different illustrative example embodiments may be combined with each other and/or substituted for each other within the scope of example embodiments.

What is claimed is:

1. An optical scanning device, comprising:
  a light beam emission unit configured to emit a light beam;
  a main scanning line deflection unit configured to deflect the light beam in a main scanning direction, to emit a scanning beam;
  a scanning lens configured to focus the scanning beam in the main scanning direction and a sub-scanning direction;
  a reflective optical element configured to deflect the scanning beam, the reflective optical element having a first end and a second end, the first end being affixed to a housing of the optical scanning device,
  a tilt adjustment unit attached to the second end of the reflective optical element, the tilt adjustment unit configured to move the second end of the reflective optical element in a direction parallel to a path of the scanning beam to adjust a tilt of a scanning line of the scanning beam irradiating a target to be irradiated; and
  a curve adjustment unit configured to bend the reflective optical element to adjust a curve in the scanning line of the scanning beam irradiating the target to be irradiated.

2. The optical scanning device according to claim 1, wherein the curve adjustment unit comprises:
  a bending unit configured to bend the reflective optical element in a direction perpendicular to a reflective surface of the reflective optical element with an energized force; and
  a pressing unit configured to press the reflective optical element in a direction opposite to the direction in which the reflective optical element is bent by the bending unit, by abutting a center in a longitudinal direction of the reflective optical element,
  wherein a pressing force of the pressing unit against said center is controlled to correct the curve in the scanning line of the scanning beam irradiating the target to be irradiated.

3. The optical scanning device according to claim 2, wherein the pressing unit comprises:
  a motor of controllable rotation angle, comprising an output shaft and a screw provided on the output shaft;
  a cap nut to engage the screw, the cap nut abutting a center of a surface opposite the reflective surface of the reflective optical element; and
  a restriction member to restrict rotation of the cap nut.

4. The optical scanning device according to claim 2, wherein the pressing unit comprises:
  a motor of controllable rotation angle; and
  a cam member rotated along with a rotation of the motor, abutting a center of a surface opposite the reflective surface of the reflective optical element.

5. The optical scanning device according to claim 1, wherein the first end of the reflective optical element is configured to remain stationary during operation of the optical scanning device such that the tilt adjustment unit rotates the second end of the reflective optical element around the first end thereof in a direction perpendicular to the reflective surface of the reflective optical element.

6. The optical scanning device according to claim 5, wherein the tilt adjustment unit comprises:
  a motor of controllable rotation angle, comprising an output shaft and a screw provided on the output shaft;
  a cap nut to engage the screw, the cap nut abutting said first end of the reflective surface of the reflective optical element, and
  a restriction member to restrict rotation of the cap nut.

7. The optical scanning device according to claim 5, wherein the tilt adjustment unit comprises:
  a motor of controllable rotation angle; and a cam member rotated along with a rotation of the motor, abutting said first end of the reflective surface of the reflective optical element.

8. An image forming apparatus, comprising:

an image bearing member configured to bear an electrostatic latent image;

a charging device configured to charge a surface of the image bearing member;

an irradiating device configured to scan and irradiate a charged surface of the image bearing member with a light beam according to image data to form an electrostatic latent image thereon;

a developing device configured to develop the electrostatic latent image with a toner to form a toner image; and a transfer device configured to transfer the toner image onto a recording medium, wherein the irradiating device is an optical scanning device, comprising:

a light beam emission unit configured to emit a light beam;

a main scanning line deflection unit configured to deflect the light beam in a main scanning direction, to emit a scanning beam;

a scanning lens configured to focus the scanning beam in the main scanning direction and a sub-scanning direction;

a reflective optical element configured to deflect the scanning beam, the reflective optical element having a first end and a second end. the first end being affixed to a housing of the optical scanning device and configured to remain stationary during operation of the optical scanning device;

a tilt adjustment unit configured to move the second end of the reflective optical element in a direction parallel to a path of the scanning beam to adjust a tilt of a scanning line of the scanning beam irradiating the image bearing member; and a curve adjustment unit configured to bend the reflective optical element to adjust a curve in the scanning line of the scanning beam irradiating the image bearing member.

\* \* \* \* \*